(12) United States Patent  
Chang et al.

(10) Patent No.: US 10,690,810 B2  
(45) Date of Patent: Jun. 23, 2020

(54) ANTIREFLECTION FILM AND DISPLAY DEVICE HAVING HARD COATING LAYER WITH SPECIFIED SURFACE ROUGHNESS AND INTERNAL HAZE

(71) Applicant: LG CHEM, LTD., Seoul (KR)

(72) Inventors: Yeong Rae Chang, Daejeon (KR); Jae Hoon Shim, Daejeon (KR); Jung Hyun Seo, Daejeon (KR); Jin Young Park, Daejeon (KR); Soo Kyoung Lee, Daejeon (KR); Jae Pil Koo, Daejeon (KR); Tae Soon Kim, Daejeon (KR); Min Soo Kim, Daejeon (KR); Kyung Ki Hong, Daejeon (KR); Joo Jong Moon, Daejeon (KR); Hye Min Lee, Daejeon (KR)

(73) Assignee: LG CHEM LTD., Seoul (KR)

( * ) Notice: Subject to any disclaimer, the term of this patent is extended or adjusted under 35 U.S.C. 154(b) by 125 days.

(21) Appl. No.: 15/739,586

(22) PCT Filed: Sep. 12, 2016

(86) PCT No.: PCT/KR2016/010272  
§ 371 (c)(1),  
(2) Date: Dec. 22, 2017

(87) PCT Pub. No.: WO2017/043948  
PCT Pub. Date: Mar. 16, 2017

(65) Prior Publication Data  
US 2018/0313978 A1  Nov. 1, 2018

(30) Foreign Application Priority Data

Sep. 11, 2015 (KR) .................. 10-2015-0129309  
Sep. 9, 2016 (KR) .................. 10-2016-0116740

(51) Int. Cl.  
C09D 133/08 (2006.01)  
G02B 1/11 (2015.01)  
(Continued)

(52) U.S. Cl.  
CPC .............. G02B 1/11 (2013.01); C08F 222/10 (2013.01); C09D 4/00 (2013.01); C09D 133/04 (2013.01);  
(Continued)

(58) Field of Classification Search  
CPC ........ B32B 17/10174; B32B 17/10201; B32B 17/10238; B32B 17/10431;  
(Continued)

(56) References Cited

U.S. PATENT DOCUMENTS 7,264,865 B2  9/2007  Matsunaga et al.  
8,215,780 B2  7/2012  Tsuno et al.  
(Continued)

FOREIGN PATENT DOCUMENTS

CN  103013219 B  7/2014  
JP  2001281410 A  10/2001  
(Continued)

*Primary Examiner* — Ryan S Dunning  
(74) *Attorney, Agent, or Firm* — Dentons US LLP

(57) ABSTRACT

The present invention relates to an antireflection film comprising a hard coating layer in which a ten-point average roughness (Rz) of the surface irregularities is 0.05 μm to 0.2 μm and an internal haze is 0.5% to 5%; and a low refractive index layer formed on the hard coating layer, and a display device comprising the antireflection film.

17 Claims, 1 Drawing Sheet

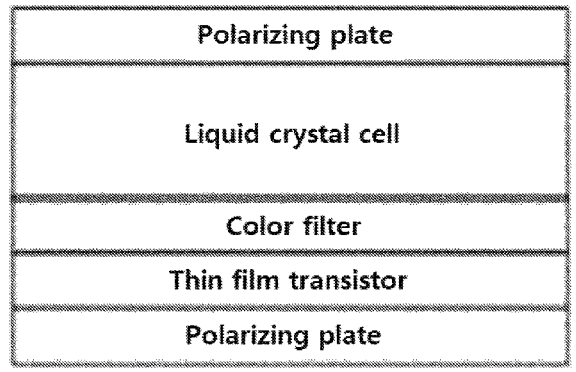
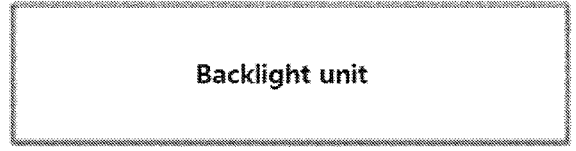

(51) Int. Cl.
*G02B 1/14* (2015.01)
*G02F 1/1335* (2006.01)
*C09D 4/00* (2006.01)
*C09D 133/04* (2006.01)
*C08F 222/10* (2006.01)
*C08G 77/04* (2006.01)

(52) U.S. Cl.
CPC ............ *C09D 133/08* (2013.01); *G02B 1/14* (2015.01); *G02F 1/133502* (2013.01); *C08G 77/045* (2013.01); *G02F 2201/38* (2013.01)

(58) Field of Classification Search
CPC ........ B32B 17/10449; B32B 17/10633; B32B 2307/42; C03C 17/3411; C03C 17/3417; C08L 33/08; C08L 33/10; G02F 1/133504; G02B 1/04; G02B 1/10; G02B 1/105; G02B 1/11; G02B 1/111; G02B 1/113; G02B 1/118; G02B 1/14; G02B 5/003; G02B 5/02; G02B 5/0205; G02B 5/0236; G02B 5/206; G02B 5/0242; G02B 5/0278; G02B 5/208; G02B 5/26; G02B 5/281; G02B 5/282; G02B 5/285; G02B 5/287; G02B 5/289
USPC ................ 252/582, 587; 264/1.24, 1.7, 1.9; 359/359, 360, 361, 488.01, 580, 584, 585, 359/586, 588, 589, 590, 592, 593, 594, 359/597, 599, 601, 609, 614, 615; 427/162, 163.1, 163.2, 164, 165; 428/1.5, 428/1.6
See application file for complete search history.

(56) References Cited

U.S. PATENT DOCUMENTS

| | | | |
|---|---|---|---|
| 8,502,939 B2 | 8/2013 | Kodama et al. | |
| 8,999,463 B2 | 4/2015 | Mikami et al. | |
| 9,046,645 B2 | 6/2015 | Hayashi et al. | |
| 2005/0152034 A1 | 7/2005 | Matsunaga | |
| 2008/0030861 A1* | 2/2008 | Ookubo | C08J 7/047 359/601 |
| 2009/0246415 A1* | 10/2009 | Horie | G02B 1/11 428/1.3 |
| 2010/0027126 A1 | 2/2010 | Chen et al. | |
| 2010/0165460 A1 | 7/2010 | Furui et al. | |
| 2011/0080644 A1 | 4/2011 | Hamamoto et al. | |
| 2013/0222913 A1* | 8/2013 | Tomoda | G02B 1/113 359/513 |
| 2014/0054738 A1* | 2/2014 | Yamamoto | C09D 183/04 257/432 |
| 2015/0116835 A1 | 4/2015 | Ogumi et al. | |
| 2018/0313978 A1* | 11/2018 | Chang | C09D 4/00 |

FOREIGN PATENT DOCUMENTS

| | | |
|---|---|---|
| JP | 2006-063147 A | 3/2006 |
| JP | 2007-163971 A | 6/2007 |
| JP | 2009-042351 A | 2/2009 |
| JP | 2009210592 A | 9/2009 |
| JP | 2010-079098 A | 4/2010 |
| JP | 4967943 B2 | 7/2012 |
| JP | 2013-061636 A | 4/2013 |
| JP | 2013-186236 A | 9/2013 |
| KR | 100841841 B1 | 6/2008 |
| KR | 20100094469 A | 8/2010 |
| KR | 20110084410 A | 7/2011 |
| KR | 101052709 B1 | 8/2011 |
| KR | 20120038701 A | 4/2012 |
| KR | 1020140006876 A | 1/2014 |
| KR | 101408637 B1 | 6/2014 |
| KR | 20140083525 A | 7/2014 |
| KR | 20150013118 A | 2/2015 |
| KR | 20150024548 A | 3/2015 |
| WO | 2009/096261 A1 | 8/2009 |
| WO | 2009/107536 A1 | 9/2009 |
| WO | 2010/055814 A1 | 5/2010 |
| WO | 2012/035849 A1 | 3/2012 |
| WO | 2013/168569 A1 | 11/2013 |

* cited by examiner

| Polarizing plate |
|---|
| Liquid crystal cell |
| Color filter |
| Thin film transistor |
| Polarizing plate |

| Backlight unit |
|---|

ANTIREFLECTION FILM AND DISPLAY DEVICE HAVING HARD COATING LAYER WITH SPECIFIED SURFACE ROUGHNESS AND INTERNAL HAZE

CROSS-REFERENCE TO RELATED APPLICATION(S)

This application is a National Stage Entry of International Application No. PCT/KR2016/010272, filed on Sep. 12, 2016, and claims the benefit of and priority to Korean Application No. 10-2015-0129309, filed on Sep. 11, 2015, and Korean Application No. 10-2016-0116740, filed on Sep. 9, 2016, all of which are hereby incorporated by reference in their entirety for all purposes as if fully set forth herein.

TECHNICAL FIELD

The present invention relates to an antireflection film and a display device. More specifically, the present invention relates to an antireflection film having reduced sparkling phenomenon and excellent visibility when applied to a high-resolution display and having excellent workability during the production of a display, and a display device providing optical characteristics such as excellent external black visibility and contrast ratio, etc., and high screen sharpness.

BACKGROUND ART

In general, a flat panel display device such as a PDP or a LCD is equipped with an antireflection film for minimizing the reflection of light incident from the outside.

As a method for minimizing the reflection of light, there exist a method (anti-glare: AG coating) in which a filler such as an inorganic fine particle is dispersed in a resin and coated on a substrate film to impart irregularities; a method (anti-reflection: AR coating) of using the interference of light by forming a plurality of layers having different refractive indexes on a substrate film; or a method for mixing them, etc.

Among them, in the case of the AG coating, the absolute amount of the reflected light is equivalent to that of a general hard coating, but a low reflection effect can be obtained by reducing the amount of light entering the eye using light scattering through irregularities. However, since the AG coating has poor surface sharpness due to the surface irregularities, many studies on AR coating have been conducted recently.

As for a film using the AR coating, a multi-layer structure in which a hard coating layer (high refractive index layer), a low reflective coating layer, and the like are stacked on a substrate film has been commercialized. However, in the case of a clear coating having no irregularities on the surface, there are disadvantages in that the anti-glare effect is not sufficient and a defect inside the display is easily visible.

Accordingly, many studies have been actively conducted to minimize the reflection of light incident from the outside while maintaining the sharpness of the image. However, as the resolution of the display increases, the degree of improvement of the physical properties is insufficient. Recently, there are cases in which a COT (color filter on TFT) structure is used as a liquid crystal panel of a liquid crystal display device.

When a liquid crystal panel having such a COT structure is used, the reflectivity of the inside of the panel is increased due to the metals included in the electrodes and the like, and thus the optical characteristics of the display such as external black visibility and contrast ratio are reduced. Accordingly, there is a need to develop a surface coating film having an excellent antireflection function while increasing the yield of the display panel.

DETAILED DESCRIPTION OF THE INVENTION

Technical Problem

It is an object of the present invention to provide an antireflection film having reduced sparkling phenomenon and excellent visibility when applied to a high-resolution display and having excellent workability during the production of a display.

Further, it is another object of the present invention to provide a display device providing optical characteristics such as excellent external black visibility and contrast ratio, etc., and high screen sharpness.

Technical Solution

In the present disclosure, there is provided an antireflection film including a hard coating layer in which a ten-point average roughness (Rz) of the surface irregularities is 0.05 μm to 0.2 μm and an internal haze is 0.5% to 5%; and a low refractive index layer formed on the hard coating layer.

The ten-point average roughness (Rz) of the surface irregularities of the hard coating layer is a measurement result using a non-contact surface shape measuring instrument (3D optical profiler).

In the result of the diffuse distribution of the reflected light source for the antireflection film, the average value of the ratio of the respective light intensity values to the specular reflection light intensity values at an angle of +1° and −1° from the specular reflection may be 0.005 to 0.100 or 0.010 to 0.080.

The result of the diffuse distribution of the reflected light source for the antireflection film applies an incident angle of 45°, and the specular reflection light intensity value is a diffuse reflection light intensity value at 45° corresponding to the specular reflection of the incident angle.

The antireflection film may have a reflectivity of 1.6% or less in a wavelength region of 380 nm to 780 nm.

The hard coating layer may include a binder resin including a (co)polymer of a photopolymerizable compound and an organic or inorganic fine particle dispersed in the binder resin.

The organic or inorganic fine particles may be spherical particles having a particle diameter of 0.5 to 10 μm or 0.5 to 5 μm, preferably 1 to 5 μm, more preferably 1 to 3 μm.

Further, the hard coating layer may include at least two types of organic or inorganic fine particles, and the difference in the refractive index between at least two types in the at least two types of organic or inorganic fine particles may be 0.01 to 0.08.

The hard coating layer may include 1 to 20 parts by weight of the organic or inorganic fine particles based on 100 parts by weight of the (co)polymer of the photopolymerizable compound.

The binder resin of the hard coating layer may further include a high molecular weight (co)polymer having a weight average molecular weight of 10,000 or higher.

The hard coating layer may further include an inorganic nanoparticle having a diameter of 1 nm to 150 nm or 5 nm to 120 nm.

The low refractive index layer may include a binder resin including a (co)polymer of a photopolymerizable compound and a fluorine-containing compound or a silicon-based compound containing a photoreactive functional group.

The photopolymerizable compound may include a monomer or oligomer containing a (meth) acrylate or vinyl group.

The photoreactive functional group contained in the fluorine-containing compound or silicon-based compound may be at least one selected from the group consisting of a (meth)acrylate group, epoxide group, vinyl group, and thiol group.

The fluorine-containing compound containing a photoreactive functional group may be at least one compound selected from the group consisting of i) an aliphatic compound or an aliphatic cyclic compound in which at least one photoreactive functional group is substituted and at least one fluorine is substituted on at least one carbon; ii) a heteroaliphatic compound or a heteroaliphatic cyclic compound in which at least one photoreactive functional group is substituted, at least one hydrogen is substituted with fluorine, and at least one carbon is substituted with silicon; iii) a polydialkylsiloxane-based polymer in which at least one photoreactive functional group is substituted and at least one fluorine is substituted on at least one silicon; and iv) a polyether compound in which at least one photoreactive functional group is substituted and at least one hydrogen is substituted with fluorine.

The antireflection film may further include an inorganic fine particle dispersed in the binder resin.

The inorganic fine particles included in the low refractive index layer may include at least one selected from the group consisting of hollow inorganic fine particles having a number average particle diameter of 10 to 200 nm and solid-type inorganic fine particles having a number average particle diameter of 0.5 to 10 nm.

The low refractive index layer may include 10 to 400 parts by weight of the inorganic fine particles and 20 to 300 parts by weight of the fluorine-containing compound or silicon-based compound including a photoreactive functional group relative to 100 parts by weight of the (co)polymer of the photopolymerizable compound.

The binder resin of the low refractive index layer may further include polysilsesquioxane having at least one reactive functional group substituted therein. The low refractive index layer may include 0.5 to 40 parts by weight of the polysilsesquioxane having at least one reactive functional group substituted therein based on 100 parts by weight of the (co)polymer of the photopolymerizable compound.

Further, in the present disclosure, there may be provided a display device including the antireflection film described above.

The display device may be a display device including a pair of polarizing plates facing each other; a thin film transistor, a color filter, and a liquid crystal cell sequentially stacked between the pair of polarizing plates; and a backlight unit.

The antireflection film may be formed on the other surface of the polarizing plate in contact with the liquid crystal cell, or between the polarizing plate and backlight unit.

Advantageous Effects

According to the present invention, there may be provided an antireflection film having reduced sparkling phenomenon and excellent visibility when applied to a high-resolution display and having excellent workability during the production of a display, and a display device providing optical characteristics, such as excellent external black visibility and contrast ratio, and high screen sharpness.

The antireflection film is applied to a high-resolution display, thereby providing a high hiding power of a panel defect and excellent antireflection performance and visibility. In particular, it may be applied to a COT panel having a high inner panel reflectivity to express the antireflection performance.

BRIEF DESCRIPTION OF DRAWINGS

FIG. 1 schematically shows a cross section of a liquid crystal display device equipped with the antireflection film of Example 1.

DETAILED DESCRIPTION OF THE EMBODIMENTS

Hereinafter, the antireflection film and display device according to specific embodiments of the present invention will be described in more detail.

In the present disclosure, a photopolymerizable compound collectively refers to a compound which causes a polymerization reaction when irradiated with a light, for example, when irradiated with a visible light or ultraviolet light. Further, a fluorine-containing compound refers to a compound containing at least one fluorine element in the compound.

Further, a (meth)acryl may include both acryl and methacryl.

In addition, a (co)polymer may include both a co-polymer and a homo-polymer.

Moreover, hollow silica particles refer to silica particles derived from a silicon compound or an organosilicon compound, in which voids are present on the surface and/or inside of the silica particles.

According to one embodiment of the present invention, there may be provided an antireflection film including a hard coating layer in which a ten-point average roughness (Rz) of the surface irregularities is 0.05 µm to 0.2 µm and an internal haze is 0.5% to 5%; and a low refractive index layer formed on the hard coating layer.

In the past, a hard coating layer having fine irregularities was usually referred to as an AG coating layer, and was composed of an irregularity structure having a height of several hundred nm to several µm. The film on which an irregularity structure is formed has excellent an anti-glare effect because it may induce a diffuse reflection when a light enters from the outside, but an image that comes out from the inside is distorted on the surface, thereby causing a problem of decreasing the sharpness and resolution of the image. In addition, a high-resolution display of UHD (ultra-high definition) or higher has a severe image distortion, and thus, it is necessary to control the concavo-convex structure.

Accordingly, the present inventors have derived an optimum surface irregularity structure capable of simultaneously implementing the antireflection effect and visibility. The surface roughness of the antireflection film is represented by ten-point average roughness (Rz) of the surface irregularities. The ten-point average roughness refers to the difference in the average value between 5 peaks of the maximum height and 5 peaks of the lowest valley within the measurement length in a surface irregularities curve.

Herein, if the Rz, which is the height of the ten-point irregularities, is between 0.05 μm to 0.2 μm, it is possible to simultaneously implement the antireflection effect and visibility. If the ten-point average roughness of the surface irregularities of the hard coating layer is less than 0.05 μm, the antireflection effect and the hiding power of a panel defect are reduced, and if the ten-point average roughness of the surface irregularities of the hard coating layer exceeds 0.2 μm, a phenomenon of resolution deterioration such as sparkling may be observed, and sharpness may be lowered.

The ten-point average roughness of the surface irregularities of the hard coating layer may be measured by using a non-contact surface shape measuring instrument (3D optical profiler).

In addition, in order to improve the hiding power of a panel defect while maintaining the visibility of the antireflection film, it is possible to impart haze to the antireflection film.

Specifically, if the internal haze of the antireflection film was between 0.5% to 5%, it was possible to enhance the hiding power of a panel defect while maintaining the sharpness. If the internal haze of the antireflection film is less than 0.5%, the hiding power of a panel may be decreased, and if the internal haze of the antireflection film exceeds 5%, it may cause a decrease in the visibility, such as a decrease in the contrast ratio.

In the result of the diffuse distribution of the reflected light source for the antireflection film, the average value of the ratio of the respective light intensity values to the specular reflection light intensity values at an angle of +1° and −1° from the specular reflection may be 0.005 or higher, 0.005 to 0.100 or 0.010 to 0.080.

In order to substantially grasp the hiding power of a display device panel, it is possible to measure the diffuse light distribution of the reflected light source. If the ratio of the respective light intensity values to the specular reflection light intensity values at an angle of +1° and −1° from specular reflection in the result of the diffuse distribution of the reflected light source for the antireflection film is 0.005 or higher, the hiding power of the display device panel is favorable. In contrast, if the ratio is less than 0.005, the ratio at which the light is diffused is significantly lowered, and the hiding power of the display device panel may also become poor.

Meanwhile, in the result of the diffuse distribution of the reflected light source for the antireflection film, if the ratio of the respective light intensity values to the specular reflection light intensity values at an angle of +1° and −1° from specular reflection becomes too high, for example, if it exceeds 0.100, the image may appear distorted or the clarity of colors may be deteriorated, which may be disadvantageous in implementing a high-resolution display.

When an incident light is introduced into the optical film such as the antireflection film, a diffuse specular reflection occurs in a direction symmetrical to the normal line of the film, and a part of light is diffused.

As a result, when incident light is introduced at a predetermined angle, for example, at an angle of 30° to 60°, or 45° with respect to the normal direction of the film, the diffusion distribution of the reflection light source indicated by the antireflection film can be obtained by measuring within a predetermined angle range with respect to the light which was made incident, diffused and reflected, for example, in the range of −85° to 85° with respect to the normal direction of the surface of the antireflection film.

The diffuse light distribution can be measured by using a photo-goniometer and a specific measuring equipment is not limited. However, for example, the reflection diffuse strength can be measured using [GP-200] manufactured by Murakami Color Research Laboratory.

The result of the diffuse distribution of the reflected light source for the antireflection film applies an incident angle of 45°. Further, the specular reflection light intensity value is a diffusion reflection light intensity value at 45° corresponding to the specular reflection of the incident angle.

The specular reflection light intensity value may be 75 to 95 or 80 to 90. If the specular reflection light intensity value of the antireflection film is 75 to 95, the color can be clearly implemented, and a clear image without distortion on the interface can be implemented. In contrast, if the light intensity value is too small, the light scattering may increase and the clarity of the image and color may be lowered. Further, if the light intensity value is too large, the hiding power may be significantly lowered, for example, the transparent electrode of the panel may become visible.

As described above, the antireflection film including a low refractive index layer formed on the hard coating layer in which a ten-point average roughness (Rz) of the surface irregularities is 0.05 μm to 0.2 μm and an internal haze is 0.5% to 5%, may have a reflectivity of 1.6% or less may exhibit an average reflectivity in a wavelength region of 380 nm to 780 nm. Thus, the antireflection film may maximize the antireflection function and inhibit deterioration of visibility caused by an external light in a COT panel, etc.

The ten-point average roughness (Rz) of the surface irregularities and the internal haze of the hard coating layer can be controlled by the composition of a composition for forming the hard coating layer and by a method for forming a hard coating layer.

The hard coating layer may be formed from a hard coating composition including a photopolymerizable compound, a photoinitiator, and organic fine particles or inorganic fine particles. Specifically, the hard coating layer may include a binder resin including a (co)polymer of a photopolymerizable compound and organic or inorganic fine particles dispersed in the binder resin.

The photopolymerizable compound included in the hard coating composition for forming a hard coating layer may be a photopolymerizable/photocurable compound capable of causing a polymerization reaction when irradiated with light such as ultraviolet rays, and may be one that is conventional in the relevant.

Specifically, the (co)polymer of the photopolymerizable compound included in the hard coating layer may be a (co)polymer formed from at least one selected from a reactive acrylate oligomer group consisting of urethane acrylate oligomer, epoxide acrylate oligomer, polyester acrylate, and polyether acrylate; and a polyfunctional acrylate monomer group consisting of dipentaerythritol hexaacrylate, dipentaerythritol hydroxy pentaacrylate, pentaerythritol tetraacrylate, pentaerythritol triacrylate, trimethylene propyl triacrylate, propoxylated glycerol triacrylate, trimethylpropane ethoxy triacrylate, 1,6-hexanediol diacrylate, propoxylated glycerol triacrylate, tripropylene glycol diacrylate, and ethylene glycol diacrylate.

The hard coating layer includes organic or inorganic fine particles together with the (co)polymer of the photopolymerizable compound to impart surface irregularities and internal haze. The organic or inorganic fine particles may be spherical particles having a particle diameter of 0.5 to 10 μm or 0.5 to 5 μm, preferably 1 to 5 μm, more preferably 1 to 3 μm.

The particle diameter of the organic or inorganic fine particles may be equal to or higher than 0.5 μm in order to express the surface irregularities and internal haze, and may be equal to or lower than 10 μm in terms of the haze or thickness of the coatings. For example, For example, when the particle diameter of the fine particle exceeds 10 μm and becomes excessively large, the thickness of the coating has to be increased in order to match the fine surface irregularities, and thus there arises a problem that the inner cracking property of the film may be reduced.

The organic or inorganic fine particles are not limited to specific examples of the organic or inorganic fine particles. For example, the organic or inorganic fine particles may be an acrylic resin, a styrene resin, organic fine particles composed of an epoxide resin and a nylon resin, silicon oxide, titanium dioxide, Indium oxide, tin oxide, zirconium oxide, and zinc oxide.

Specific examples of the organic or inorganic fine particles are not limited, but for example, the organic and inorganic fine particles may be organic fine particles consisting of acryl-based resin, styrene-based resin, epoxy resin, and nylon resin, or may be inorganic fine particles consisting of silicon oxide, titanium dioxide, indium oxide, tin oxide, zirconium oxide, and zinc oxide.

The hard coating layer may include 1 to 20 parts by weight or 5 to 15 parts by weight, preferably 6 to 10 parts by weight of the organic or inorganic fine particles relative to 100 parts by weight of the (co)polymer of the photopolymerizable compound.

If the organic or inorganic fine particles are contained in an amount of less than 1 part by weight based on 100 parts by weight of the (co)polymer of the photopolymerizable compound, the haze value caused by an internal scattering may not be sufficiently implemented. Further, if the amount of the organic or inorganic fine particles exceeds 20 parts by weight based on 100 parts by weight of the (co)polymer of the photopolymerizable compound, the viscosity of the coating composition is increased and thus a poor coating property may be observed.

Furthermore, the refractive index of the organic or inorganic fine particles is different from the refractive index of a photocurable resin forming a matrix. An appropriate difference in refractive index is determined according to the content of the particles, and it is preferable to have the difference in refractive index of 0.01 to 0.08. If the difference in the refractive index between the fine particles and the photocurable resin is less than 0.01, it may be difficult to obtain an appropriate haze value. In addition, if the difference in the refractive index between the fine particles and the photocurable resin exceeds 0.08, a desired level of the surface irregularities cannot be obtained because a very small amount of the particles must be used.

Specifically, the organic and inorganic fine particles may be at least one selected from an organic fine particle group consisting of an acryl-based resin, styrene-based resin, epoxy resin, nylon resin, and a copolymer resin thereof; and an inorganic fine particle group consisting of silicon oxide, titanium dioxide, indium oxide, tin oxide, zirconium oxide, and zinc oxide.

More specifically, the organic fine particles may be at least one selected from the group consisting of methyl (meth)acrylate, ethyl (meth)acrylate, propyl (meth)acrylate, n-butyl (meth)acrylate, isobutyl (meth)acrylate, t-butyl (meth)acrylate, 2-ethylhexyl (meth)acrylate, n-octyl (meth) acrylate, lauryl (meth)acrylate, stearyl (meth)acrylate, 2-hydroxyethyl (meth)acrylate, polyethylene glycol (meth)acrylate, methoxypolyethylene glycol (meth)acrylate, glycidyl (meth)acrylate, dimethylaminoethyl (meth)acrylate, diethylaminoethyl (meth)acrylate, styrene, p-methylstyrene, m-methylstyrene, p-ethylstyrene, m-ethylstyrene, p-chlorostyrene, m-chlorostyrene, p-chloromethylstyrene, m-chloromethylstyrene, styrenesulfonic acid, p-t-butoxystyrene, m-t-butoxystyrene, vinyl acetate, vinyl propionate, vinyl butyrate, vinyl ether, allyl butyl ether, allyl glycidyl ether, (meth)acrylic acid, maleic acid, unsaturated carboxylic acid, alkyl (meth)acrylamide, (meth)acrylonitrile, and (meth) acrylate.

Further, as the organic fine particles, one single substance selected from the group consisting of polystyrene, polymethyl methacrylate, polymethyl acrylate, polyacrylate, polyacrylate-co-styrene, polymethyl acrylate-co-styrene, polymethyl methacrylate-co-styrene, polycarbonate, polyvinyl chloride, polybutylene terephthalate, polyethylene terephthalate, polyamides, polyimides, polysulfone, polyphenylene oxide, polyacetal, epoxy resin, phenol resin, silicone resin, melamine resin, benzoguanamine, polydivinylbenzene, polydivinylbenzene-co-styrene, polydivinylbenzene-co-acrylate, polydiallyl phthalate, and triallyl isocyanurate polymer, or a copolymer of two or more thereof may be used, but is not limited thereto.

Meanwhile, the hard coating layer may further include an inorganic nanoparticle having a diameter of 1 nm to 50 nm or 5 nm to 120 nm. A predetermined functional group or compound may be bonded to the surface of the inorganic nanoparticle.

As the inorganic nanoparticles are used, it is possible to smoothly control the shape of surface irregularities of the hard coating layer and improve the mechanical characteristics of the coating layer. Herein, the inorganic nanoparticles may be used in an amount of 10 parts by weight or less based on 100 parts by weight of the (co)polymer of the photopolymerizable compound. Specific examples of the inorganic nanoparticles include silicon oxide, alumina, titania, etc.

The hard coating composition for forming a hard coating layer may include a photoinitiator, and as the photoinitiator, any photoinitiators conventionally known in the art may be used without particular limitation. Examples of the photoinitiator include one single substance or a mixture of two or more selected from 1-hydroxycyclohexyl phenyl ketone, benzyl dimethyl ketal, hydroxydimethyl acetophenone, benzoin, benzoin methyl ether, benzoin ethyl ether, benzoin isopropyl ether, and benzoin butyl ether, but the present invention is not limited by the examples described above.

Herein, the photoinitiator may be added in an amount of 0.1 to 10 parts by weight based on 100 parts by weight of the photopolymerizable compound. If the photoinitiator is contained in an amount of less than 0.1 part by weight based on 100 parts by weight of the photopolymerizable compound, a sufficient photocuring due to an ultraviolet irradiation may not occur. If the photoinitiator is contained in an amount of exceeding 10 parts by weight based on 100 parts by weight of the photopolymerizable compound, the film strength of the finally formed anti-glare film may be lowered.

Meanwhile, the hard coating composition for forming a hard coating layer may further include an organic solvent. When such an organic solvent is added, there is no limitation in its composition. However, in consideration of securing an appropriate viscosity of the coating composition and the film strength of the finally formed film, the organic solvent may be used in an amount of preferably 50 to 500 parts by weight, more preferably 100 to 400 parts by weight, and most preferably 150 to 350 parts by weight based on 100 parts by weight of the photocurable resin.

Herein, the type of the organic solvent that can be used is not limited in its constitution, but one type or a mixture of one or more types selected from the group consisting of lower alcohols having 1 to 6 carbon atoms, acetates, ketones, cellosolves, dimethylformamide, tetrahydrofuran, propylene glycol monomethyl ether, and xylene may be used.

Herein, examples of the lower alcohols include methanol, ethanol, isopropyl alcohol, butyl alcohol, isobutyl alcohol, diacetone alcohol or the like, but the present invention is not limited thereto. Further, as the acetates, methyl acetate, ethyl acetate, isopropyl acetate, butyl acetate, or cellosolve acetate may be used, and as the ketones, methyl ethyl ketone, methyl isobutyl ketone, acetylacetone, or acetone may be used, but are not limited to the examples described above.

Meanwhile, the hard coating composition for forming a hard coating layer may further include at least one additive selected from the group consisting of a leveling agent, a wetting agent, and a defoaming agent. Herein, the additives may each be added within the range of 0.01 to 10 parts by weight based on 100 parts by weight of the photopolymerizable compound.

The leveling agent serves to uniformize the surface of a coated coating film using an anti-glare coating composition. Further, as the wetting agent serves to lower the surface energy of the anti-glare coating composition, it helps to achieve a uniform coating when coating the anti-glare coating composition on a transparent substrate layer.

Herein, the defoaming agent may be added to remove bubbles in the anti-glare coating composition.

The hard coating layer may have a thickness of from 0.5 μm to 100 μm.

Meanwhile, the low refractive index layer can be prepared using a photocurable coating composition including a photopolymerizable compound, a fluorine-containing compound or silicon-based compound containing a photoreactive functional group, and a photoinitiator. The antireflection film including such a low refractive index layer can improve abrasion resistance or scratch resistance while further lowering reflectivity and increasing light transmittance, and at the same time, it can secure an excellent antifouling property against external pollutants.

Specifically, the low refractive index layer may include a binder resin including a (co)polymer of a photopolymerizable compound and a fluorine-containing compound or silicon-based compound containing a photoreactive functional group.

The photopolymerizable compound may include a monomer or an oligomer containing a (meth)acrylate or vinyl group. Specifically, the photopolymerizable compound may include a monomer or an oligomer containing one or more or two or more, or three or more of (meth)acrylates or vinyl groups.

Specific examples of the monomer or oligomer containing (meth)acrylate include, pentaerythritol tri(meth)acrylate, pentaerythritol tetra(meth)acrylate, dipentaerythritol penta(meth)acrylate, dipentaerythritol hexa(meth)acrylate, tripentaerythritol hepta(meth)acrylate, trilene diisocyanate, xylene diisocyanate, hexamethylene diisocyanate, trimethylolpropane tri(meth)acrylate, trimethylolpropane polyethoxy tri(meth)acrylate, trimethylolpropane trimethacrylate, ethylene glycol dimethacrylate, butanediol dimethacrylate, hexaethyl methacrylate, butyl methacrylate, or a mixture of two or more thereof, or urethane-modified acrylate oligomer, epoxide acrylate oligomer, ether acrylate oligomer, dendritic acrylate oligomer, or a mixture of two or more thereof. Herein, the molecular weight of the oligomers is preferably 1,000 to 10,000.

Specific examples of the monomer or oligomer containing a vinyl group include divinylbenzene, styrene, or para-methyl styrene.

Meanwhile, the photopolymerizable compound may further include a fluorine-based (meth)acrylate-based compound in addition to the monomers or oligomers described above. When the fluorine-based (meth)acrylate-based compound is further included, the weight ratio of the fluorine-based (meth)acrylate-based compound to the monomer or oligomer containing a (meth)acrylate or vinyl group may be 0.1% to 10%.

Specific examples of the fluorine-based (meth)acrylate-based compound include at least one compound selected from the group consisting of the following Chemical Formulae 1 to 5.

[Chemical Formula 1]

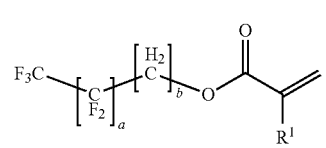

in Chemical Formula 1, $R^1$ is a hydrogen group, or an alkyl group having 1 to 6 carbon atoms, a is an integer of 0 to 7, and b is an integer of 1 to 3.

[Chemical Formula 2]

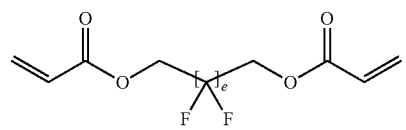

in Chemical Formula 2, c is an integer of 1 to 10.

[Chemical Formula 3]

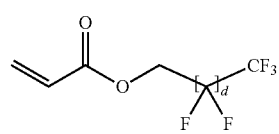

in Chemical Formula 3, d is an integer of 1 to 11.

[Chemical Formula 4]

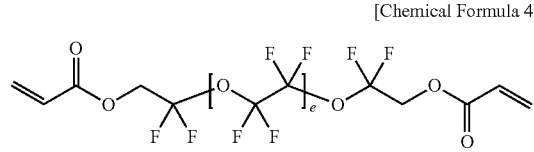

in Chemical Formula 4, e is an integer of 1 to 5.

[Chemical Formula 5]

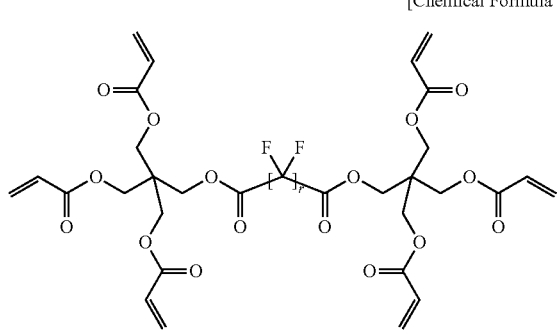

in Chemical Formula 5, f is an integer of 4 to 10.

On the other hand, the fluorine-containing compound or silicon-based compound containing a photoreactive functional group may include or be substituted with at least one photoreactive functional group, and the photoreactive functional group refers to a functional group which can participate in a polymerization reaction by irradiation of light, for example, by irradiation of visible light or ultraviolet light. The photoreactive functional group may include various functional groups known to be able to participate in a polymerization reaction by irradiation of light. Specific examples thereof include a (meth)acrylate group, an epoxide group, a vinyl group or a thiol group.

The fluorine-containing compound or silicon-based compound containing a photoreactive functional group may each have a weight-average molecular weight (weight-average molecular weight in terms of polystyrene measured by GPC method) of 2,000 to 200,000, preferably 5,000 to 100,000.

If the weight-average molecular weight of the fluorine-containing compound or silicon-based compound containing a photoreactive functional group is too small, the fluorine-containing compounds or silicon-based compounds in the photocurable coating composition cannot be uniformly and effectively aligned on the surface and are positioned inside of the finally produced low refractive index layer. Accordingly, the antifouling property of the surface of the low refractive index layer is reduced, and the crosslinking density of the low refractive index layer is lowered, thereby deteriorating the mechanical properties, such as the overall strength and scratch resistance.

Further, if the weight-average molecular weight of the fluorine-containing compound or silicon-based compound containing a photoreactive functional group is too large, the compatibility with other components in the photocurable coating composition may be lowered, and thus the haze of the finally produced low refractive index layer may increase or the light transmittance may decrease, and the strength of the low refractive index layer may also be lowered.

Specifically, the fluorine-containing compound containing a photoreactive functional group may be i) an aliphatic compound or an aliphatic cyclic compound in which at least one photoreactive functional group is substituted and at least one fluorine is substituted on at least one carbon; ii) a heteroaliphatic compound or a heteroaliphatic cyclic compound in which at least one photoreactive functional group is substituted, at least one hydrogen is substituted with fluorine, and at least one carbon is substituted with silicon; iii) a polydialkylsiloxane-based polymer (for example, polydimethylsiloxane-based polymer) in which at least one photoreactive functional group is substituted and at least one fluorine is substituted on at least one silicon; iv) a polyether compound in which at least one photoreactive functional group is substituted and at least one hydrogen is substituted with fluorine; or a mixture of two or more of i) to iv), or a copolymer thereof.

The photocurable coating composition may include 20 to 300 parts by weight of the fluorine-containing compound or silicon-based compound based on 100 parts by weight of the photopolymerizable compound.

The fluorine-containing compound containing a photoreactive functional group may further include silicon or a silicon compound. That is, the fluorine-containing compound containing a photoreactive functional group may optionally contain silicon or a silicon compound therein, and specifically, the content of silicon in the fluorine-containing compound containing a photoreactive functional group may be 0.1% by weight to 20% by weight.

The antireflection film may further include inorganic fine particles dispersed in the binder resin.

More specifically, the inorganic fine particles included in the low refractive index layer may include at least one selected from the group consisting of hollow inorganic fine particles having a number average particle diameter of 10 to 200 nm and solid-type inorganic fine particles having a number average particle diameter of 0.5 to 10 nm.

The solid-type inorganic fine particles refer to particles having a maximum diameter in a micron or nano unit and having no void therein. Specific examples of the solid-type inorganic fine particles include nanosilica particles.

Further, the hollow inorganic fine particles refer to particles having a maximum diameter in a micron or nano unit and having voids on the surface and/or inside thereof. Specific examples of the hollow inorganic fine particles include hollow silica particles.

The hollow silica particles refer to silica particles derived from a silicon compound or an organosilicon compound, in which voids are present on the surface and/or inside of the silica particles.

In the hollow silica particles, inorganic fine particles may have a number average particle diameter of 10 to 100 nm. The hollow silica particles refer to silica particles in which voids are present on the surface and/or inside of the particles. The hollow silica particles may have a refraction index than lower than that of the particles filled therein and thus can exhibit excellent antireflection properties.

The hollow silica particles may have a number average particle diameter of 10 to 100 nm, preferably 20 to 70 nm, more preferably 30 to 70 nm; and the shape of the particles is preferably spherical, but it may be amorphous.

In addition, as the hollow silica particles, a hollow silica particle whose surface is coated with a fluorine-based compound may be used either alone or in combination with hollow silica particles whose surface is not coated with a fluorine-based compound. When the surface of the hollow silica particles is coated with a fluorine-based compound, the surface energy may be further reduced. Accordingly, the hollow silica particles may be more uniformly distributed in the photocurable coating composition of the embodiment above, and the durability and scratch resistance of the film obtained from the photocurable coating composition may be further improved.

As a method of coating the surface of the hollow silica particles with a fluorine-based compound, a conventionally known particle coating method, polymerization method, and the like may be used without particular limitation. For example, the fluorine-based compound may be bonded to the surface of the hollow silica particles via hydrolysis and a condensation reaction by subjecting the hollow silica particles and the fluorine-based compound to a sol-gel reaction in the presence of water and a catalyst.

Further, the hollow silica particles may be included in the composition in a colloidal phase dispersed in a predetermined dispersion medium. The colloidal phase containing the hollow silica particles may contain an organic solvent as a dispersion medium.

Herein, the hollow silica may include a predetermined functional group substituted on the surface thereof to be more readily dispersed in the organic solvent. Examples of organic functional groups which can be substituted on the surface of the hollow silica particles are not particularly limited, but for example, a (meth) acrylate group, a vinyl group, a hydroxyl group, an amine group, an allyl group, an epoxy group, a hydroxyl group, an isocyanate group, an amine group, or fluorine, etc. may be substituted on the surface of the hollow silica.

The solid content of the hollow silica particles in the colloidal phase of the hollow silica particles may be determined in consideration of the range of content of the hollow silica in the photocurable coating composition of the one embodiment or the viscosity of the photocurable coating composition, etc., and for example, the solid content of the hollow silica particles in the colloidal phase may range from 5% by weight to 60% by weight.

Herein, examples of the organic solvent in the dispersion medium include alcohols such as methanol, isopropyl alcohol, ethylene glycol and butanol, etc.; ketones such as methyl ethyl ketone and methyl isobutyl ketone, etc.; aromatic hydrocarbons such as toluene and xylene, etc.; amides such as dimethylformamide, dimethylacetamide and N-methylpyrrolidone; etc.; esters such as ethyl acetate, butyl acetate and gamma-butylolactone, etc; ethers such as tetrahydrofuran and 1,4-dioxane, etc.; or a mixture thereof.

The low refractive index layer may include 10 to 400 parts by weight or 50 to 300 parts by weight of the inorganic fine particles based on 100 parts by weight of the (co)polymer of the photopolymerizable compound. If the inorganic fine particles are added in an excessive amount, the scratch resistance and abrasion resistance of the coating film may be deteriorated due to a decrease in the content of the binder.

Meanwhile, the binder resin of the low refractive index layer may further include polysilsesquioxane in which at least one reactive functional group is substituted. As the polysilsesquioxane in which at least one reactive functional group is substituted contains reactive functional groups on the surface thereof, the mechanical properties of the low refractive index layer, for example, scratch resistance, may be enhanced.

The low refractive index layer may include 0.5 to 40 parts by weight or 1.5 to 30 parts by weight of the polysilsesquioxane having at least one reactive functional group substituted therein relative to 100 parts by weight of the (co) polymer of the photopolymerizable compound.

If the content of the polysilsesquioxane having at least one reactive functional group substituted therein relative to the (co)polymer of the photopolymerizable compound in the photocurable coating composition is too small, it may be difficult to ensure sufficient scratch resistance of the coating film or the binder resin formed upon photocuring of the photocurable coating composition. Further, if the content of the polysilsesquioxane having at least one reactive functional group substituted therein relative to the photopolymerizable compound in the photocurable coating composition is too large, the transparency of the low refractive index layer or antireflection film manufactured from the photocurable coating composition may be decreased, and the scratch resistance may rather be decreased.

The reactive functional group substituted in the polysilsesquioxane may include at least one functional group selected from the group consisting of alcohol, amine, carboxylic acid, epoxide, imide, (meth)acrylate, nitrile, norbornene, olefin [ally, cycloalkenyl, or vinyldimethylsilyl, etc.], polyethylene glycol, thiol, and vinyl and may preferably be epoxide or (meth)acrylate.

More specific examples of the reactive functional group include (meth)acrylates, alkyl (meth)acrylates having 1 to 20 carbon atoms, cycloalkyl epoxide having 3 to 20 carbon atoms, and cycloalkane epoxide having 1 to 10 carbon atoms.

The alkyl (meth)acrylate means that the other part of 'alkyl' that is not bonded to (meth)acrylate is a boding position, the cycloalkyl epoxide means that the other part of 'cycloalkyl' that is not bonded to an epoxide is a bonding position, and the alkyl cycloalkane epoxide means that the other part of 'alkyl' that is not bonded to a cycloalkane epoxide is a bonding position.

Meanwhile, the polysilsesquioxane in which at least one reactive functional group is substituted may further include at least one unreactive functional group selected from the group consisting of a linear or branched alkyl group having 1 to 20 carbon atoms, a cyclohexyl group having 6 to 20 carbon atoms, and an aryl group having 6 to 20 carbon atoms, in addition to the reactive functional groups described above. Thus, as the reactive functional groups and unreactive functional groups are substituted on the surface of the polysilsesquioxane, the siloxane bond (—Si—O—) in the polysilsesquioxane in which at least one reactive functional group is substituted is positioned inside the molecule and is not exposed to the outside, so that the compatibility with other components can be further enhanced. Further, as the siloxane bonds are firmly bonded between the reactive functional groups or other organic components, thereby being not separated by the external pressure. Further, it can serve as a rigid support in the coating film or the binder resin formed during the photocuring of the photocurable coating composition. Therefore, the strength and scratch resistance of the finally produced low reflective index layer and antireflection film can be greatly increased.

Meanwhile, the polysilsesquioxane may be represented by $(RSiO_{1.5})_n$ (where n is 4 to 30 or 8 to 20), and may have various structures such as random, ladder type, cage and partial cage, etc.

However, in order to enhance the physical properties and quality of the low refractive index layer and antireflection film produced from the photocurable coating composition, a polyhedral oligomeric silsesquioxane having a cage structure, in which at least one reactive functional group is substituted, may be used as the polysilsesquioxane in which at least one reactive group is substituted. Further, more preferably, the polyhedral oligomeric silsesquioxane having a cage structure, in which at least one functional group is substituted, may include 8 to 20 silicon atoms in a molecule.

Furthermore, at least one silicon atom of the polyhedral oligomeric silsesquioxane having a cage structure may be substituted with a reactive functional group, and the silicon atoms in which no reactive functional groups are substituted may be substituted with the unreactive functional groups described above.

As at least one silicon atom of the polyhedral oligomeric silsesquioxane having a cage structure is substituted with a reactive functional group, the mechanical properties of the coating film or the binder resin formed upon photocuring of the photocurable coating composition may be enhanced. In addition, as the remaining silicon atoms are substituted with unreactive functional groups, a steric hindrance appears molecular structurally, which significantly decreases the frequency or probability of exposure of the siloxane bond (—Si—O—) to the outside, thereby enhancing the compatibility with other organic components, and the siloxane bonds are firmly bonded between the reactive functional groups or other organic components, thereby being not separated by the external pressure. Further, it can serve as a rigid support in the coating film or the binder resin formed during the photocuring of the photocurable coating composition. Therefore, the strength and scratch resistance of the finally produced low refractive index layer or antireflection film can be greatly increased.

Examples of the polyhedral oligomeric silsesquioxane (POSS) having a cage structure in which at least one reactive functional group is substituted include POSS in which at least one alcohol is substituted, such as TMP diolisobutyl POSS, cyclohexanediol isobutyl POSS, 1,2-Propanediolisobutyl POSS, octa(3-hydroxy-3 methylbutyldimethylsiloxy) POSS, etc.; POSS in which at least one amine is substituted, such as aminopropylisobutyl POSS, aminopropylisooctyl POSS, aminoethylaminopropyl isobutyl POSS, N-phenylaminopropyl POSS, N-methylaminopropyl isobutyl POSS, octaammonium POSS, aminophenylcyclohexyl POSS, aminophenylisobutyl POSS, etc.; POSS in which at least one carboxylic acid is substituted, such as maleamic acid-cyclohexyl POSS, maleamic acid-isobutyl POSS, octa maleamic acid POSS, etc; POSS in which at least one epoxide is substituted, such as epoxycyclohexylisobutyl POSS, epoxycyclohexyl POSS, glycidyl POSS, glycidylethyl POSS, glycidylisobutyl POSS, glycidylisooctyl POSS, etc.; POSS in which at least one imide is substituted, such as POSS maleimide cyclohexyl, POSS maleimide isobutyl, etc.; POSS in which at least one (meth)acrylate is substituted, such as ccrylolsobutyl POSS, (meth)acrylisobutyl POSS, (meth)acrylate cyclohexyl POSS, (meth)acrylate isobutyl POSS, (meth)acrylate ethyl POSS, (meth)acrylethyl POSS, (meth)acrylate isooctyl POSS, (meth)acryllsooctyl POSS, (meth)acrylPhenyl POSS, (meth)acryl POSS, acrylo POSS, etc.; POSS in which at least one nitrile group is substituted, such as cyanopropylisobutyl POSS, etc.; POSS in which at least one norbornene is substituted, such as norbornenylethylethyl POSS, norbornenylethylisobutyl POSS, norbornenylethyl disilanoisobutyl POSS, trisnorbornenyl isobutyl POSS, etc.; POSS in which at least one vinyl group is substituted, such as allylisobutyl POSS, monovinylisobutyl POSS, octacyclohexenyldimethylsilyl POSS, octavinyldimethylsilyl POSS, octavinyl POSS, etc.; POSS in which at least one olefin is substituted, such as allylisobutyl POSS, monovinylisobutyl POSS, octacyclohexenyldimethylsilyl POSS, octavinyldimethylsilyl POSS, octavinyl POSS, etc.; POSS in which a PEG having 5 to 30 carbon atoms is substituted; or POSS in which at least one thiol group is substituted, such as mercaptopropylisobutyl POSS or Mercaptopropyllsooctyl POSS, etc.

Any compound known to be usable in the photocurable resin composition may be used as the photopolymerization initiator without particular limitation. Specifically, a benzophenone-based compound, an acetophenone-based compound, a nonimidazole-based compound, a triazine-based compound, an oxime-based compound, or a mixture of two or more thereof may be used.

The photopolymerization initiator may be used in an amount of 1 to 100 parts by weight based on 100 parts by weight of the photopolymerizable compound. If the amount of the photopolymerization initiator is too small, the photocurable coating composition may be uncured in the photocuring step and thus residual substances may appear. If the amount of the photopolymerization initiator is too large, the unreacted initiator may remain as an impurity or the cross-linking density may be reduced, which in turn may deteriorate the mechanical properties of the manufactured film or significantly increase the reflectivity.

Meanwhile, the photocurable coating composition may further include an organic solvent.

Non-limiting examples of the organic solvent include ketones, alcohols, acetates and ethers, or mixtures of two or more thereof.

Specific examples of the organic solvent include ketones such as methyl ethyl ketone, methyl isobutyl ketone, acetylacetone or isobutyl ketone, etc.; alcohols such as methanol, ethanol, n-propanol, i-propanol, n-butanol, i-butanol or t-butanol, etc.; acetates such as ethyl acetate, i-propyl acetate, or polyethylene glycol monomethyl ether acetate, etc.; ethers such as tetrahydrofuran or propylene glycol monomethyl ether, etc.; or a mixture of two or more thereof.

The organic solvent may be added at the time of mixing the respective components to be included in the photocurable coating composition, or may be included in the photocurable coating composition as the respective components are added in a state of being dispersed or mixed in the organic solvent.

If the content of the organic solvent in the photocurable coating composition is too small, the flowability of the photocurable coating composition may be reduced, resulting in defects, such as generation of stripes in the finally produced film, or the like. Further, if the organic solvent is added in an excessive amount, the solid content is lowered, and the coating and film formation are not sufficiently made, so that the physical properties or the surface characteristics of the film may be reduced, and defects may occur during the drying and curing processes. Accordingly, the photocurable coating composition may include the organic solvent such that the concentration of the total solid content of the components contained therein may be 1% by weight to 50% by weight or 2% by weight to 20% by weight Meanwhile, the antireflection film may be obtained by coating the hard coating composition onto one side of a substrate, and drying and photocuring the same, followed by coating a coating composition for forming a low refractive index layer on the formed hard coating layer and then photocuring the coated product. Herein, the hard coating layer may be semi-cured, and a method of performing a final curing when curing the low refractive index layer is most preferable.

The specific type and thickness of the substrate are not particularly limited, and any substrate known to be usable in the production of a low refractive index layer or antireflection film may be used without particular limitation.

A method and apparatus conventionally used for coating the photocurable coating composition may be used without particular limitation, and for example, a bar coating method such as Meyer bar, a gravure coating method, a 2-roll reverse coating method, a vacuum slot die coating method, and 2 roll coating method, etc. may be used.

The hard coating layer may preferably have a final dry thickness of 1 μm to 10 μm, and if the final dry thickness is 1 μm or less, the mechanical strength of the coating layer is lowered and it may be difficult to implement fine irregularities on the surface. Further, it the final dry thickness is 10 μm or higher, there may be a disadvantage in that cracks may easily occur when handling the coating film, because the coating layer is thick. The low refractive index layer may have a thickness of 1 nm to 300 nm or 50 nm to 200 nm.

In the step of photocuring the photocurable coating composition, ultraviolet rays or visible rays having a wavelength of 200 to 400 nm may be irradiated, and an exposure amount during irradiation may preferably be 100 to 4,000 $mJ/cm^2$. The exposure time is not particularly limited, and may be appropriately adjusted depending on the exposure apparatus used, the wavelength of the irradiation light, or the exposure amount.

Further, in the step of photocuring the photocurable coating composition, nitrogen purging or the like may be performed in order to apply nitrogen atmosphere conditions.

The antireflection film produced by the above-described method may have an average reflectivity of 1.6% or less.

Meanwhile, according to another embodiment of the present invention, there may be provided a display device including the above-described antireflection film.

The display device may be a display device including a pair of polarizing plates facing each other; a thin film transistor, a color filter, and a liquid crystal cell sequentially stacked between the pair of polarizing plates; and a backlight unit.

As shown in FIG. 1, the schematic structure of the display device, according to FIG. 1, is equipped with a liquid crystal panel having a structure in which a thin film transistor, a color filter, and a liquid crystal cell are sequentially stacked, and polarizing plates equipped on both sides thereof.

The antireflection film may be formed on the other surface of the polarizing plate in contact with the liquid crystal cell, or between the polarizing plate and backlight unit.

Specific embodiments of the present invention will be described in more detail by way of Examples. However, the Examples are only for illustrative of the specific embodiments of the invention, and the disclosure of the specific embodiments of the invention is not intended to be limited by these Examples.

Preparation Examples 1 to 5: Preparation of Hard Coating Solutions

Anti-glare hard coating compositions were prepared by mixing the components in Table 1 below.

[Component Information]
BEAMSET 371: Manufactured by Arakawa, epoxy acrylate polymer, molecular weight of 40,000
UA-306I: Urethane-based acrylic oligomer (manufactured by Kyoeisha)
8BR-500: Photocurable urethane acrylate polymer (MW 250,000, manufactured by Dae Sung Chemical Co., Ltd.)
TMPTA: Trimethylolpropane triacrylate
PETA: Pentaerythritol triacrylate (Polyfunctional monomer, molecular weight of 298)
Irgacure 184: Photoinitiator (manufactured by Ciba)
IPA: Isopropyl alcohol
EtOH: Ethanol
103BQ: Spherical acrylic-styrene copolymer resin particles (average particle diameter of about 2 μm, refractive index of about 1.515, XX-103BQ, manufactured by Sekisui Plastic)
113BQ: Spherical acrylic-styrene copolymer resin particles (average particle diameter of about 2 μm, refractive index of about 1.555, XX-113BQ, manufactured by Sekisui Plastic)
Spherical organic particle 1: acrylic-styrene copolymer resin which is spherical organic particle having an average particle diameter of 3.5 μm and a refractive index of 1.555 (XX-68BQ, manufactured by Sekisui Plastic)
X24-9600A: Silica particles having a volume average particle diameter of 100 nm (manufactured by Shinetsu)
MA-ST: Nano silica dispersion (manufactured by Nissan Chemical)

TABLE 1

[(unit: g)]

| | | Preparation Example 1 | Preparation Example 2 | Preparation Example 3 | Preparation Example 4 | Preparation Example 5 |
|---|---|---|---|---|---|---|
| Acryl-based resin/oligomer | UA-306I | | | 3 | 3 | 4 |
| | BEAMSET 371 | | 8 | | | 8 |
| | 8BR-500 | 8 | | 6 | 6 | |
| Polyfunctional monomer | TMPTA | | 22 | 21 | 21 | |
| | PETA | 22 | | | | 18 |
| Photoinitiator | Irgacure 184 | 2 | 2 | 2 | 2 | 2 |
| Leveling agent | BYK 300 | 0.5 | 0.5 | 0.5 | 0.5 | 0.5 |
| Solvent | IPA | 33 | 33 | 40 | 4 | 66 |
| | EtOH | 33 | 33 | 20 | 20 | |
| Fine particles | 103BQ | 0.5 | | | | |
| | 113BQ | | 0.4 | 1 | 0.8 | |
| | Spherical organic particles 1 | | | | | 1 |
| | X24-9600A | | 0.5 | | 0.4 | |
| | MA-ST | 0.2 | 0.2 | 0.2 | 0.2 | 0.1 |
| Total | | 99.2 | 99.6 | 93.7 | 57.9 | 87.6 |
| Solid content (wt %) | | 33.82 | 33.59 | 35.82 | 58.30 | 38.28 |
| Fine particle content (wt %) | | 0.56 | 0.96 | 1.06 | 1.26 | 1.03 |
| Fine particle/binder | | 1.87 | 3.2 | 3.53 | 4.2 | 3.43 |

Comparative Preparation Examples 1 to 4: Preparation of Hard Coating Solutions

Anti-glare hard coating compositions were prepared in the same manner as in Preparation Example 1, except that the components shown in Table 2 were used.

TABLE 2

| | | Comparative Preparation Example 1 | Comparative Preparation Example 2 | Comparative Preparation Example 3 | Comparative Preparation Example 4 |
|---|---|---|---|---|---|
| | | (unit: g) | | | |
| Acryl-based resin/oligomer | UA-306I | 3 | 4 | | |
| | BEAMSET 371 | | 4 | 4 | |
| | 8BR-500 | 5 | | | |
| Polyfunctional monomer | TMPTA | 22 | | 26 | 10 |
| | PETA | | 22 | | 20 |
| Photoinitiator | Irgacure 184 | 2 | 2 | 2 | 2 |
| Leveling agent | BYK 300 | 0.5 | 0.5 | 0.5 | 0.5 |
| Solvent | IPA | 33 | 66 | 66 | 33 |
| | EtOH | 33 | | | 33 |
| Fine particles | 103BQ | | | 0.2 | 0.5 |
| | 113BQ | 0.8 | 1 | | |
| | Spherical organic particles 1 | | | | |
| | X24-9600A | | | | |
| | MA-ST | 0.1 | 1.0 | 0.1 | 0.2 |
| Total | | 99.4 | 100.5 | 98.8 | 99.7 |
| Solid content (wt %) | | 33.53 | 33.63 | 32.93 | 33.16 |
| Fine particle content (wt %) | | 0.83 | 1.30 | 0.23 | 1.06 |
| Fine particle/binder | | 2.77 | 4.33 | 0.7 | 3.53 |

Preparation Examples 6 and 7: Preparation of Resin Compositions for Preparing Low Refractive Index Layer Preparation Example 6: Preparation of Resin Composition for Preparing Low Refractive Index Layer 1 (LR1)

0.37 g of a polyfunctional monomer (DPHA, molecular weight of 536), 0.13 g of a fluorine-based additive (RS907, DIC Corporation), 15 g of methyl isobutyl ketone as a solvent and 16 g of propylene glycol monomethyl ether were added and stirred. Then, 0.03 g of polysilsesquioxane (MA0701, Hybrid Plastics Inc.) was added while stirring, and 2.5 g of hollow silica (Thrulya 4320, manufactured by Japan Catalysts and Chemicals) was added at last, and the mixture was sufficiently stirred to prepare a low refractive index coating solution.

Preparation Example 7: Preparation of Resin Composition for Preparing Low Refractive Index Layer 2 (LR2)

0.37 g of a polyfunctional monomer (DPHA, molecular weight of 536), 0.13 g of a fluorine-based additive (RS907, DIC Corporation), 15 g of methyl isobutyl ketone as a solvent and 16 g of propylene glycol monomethyl ether were added and stirred. Then, 0.02 g of silica dispersion (MIBK-ST, Nissan Chemical Industries, Ltd) having a volume average particle diameter of 12 nm was added while stirring, and 2.5 g of hollow silica (Thrulya 4320, Japan Catalysts and Chemicals) was added at last, and the mixture was sufficiently stirred to prepare a low refractive index coating solution.

Examples and Comparative Examples: Preparation of Antireflection Films

The hard coating solutions prepared in each of the Preparation Examples or Comparative Examples were coated onto a triacetyl cellulose film having a thickness of 40 μm with Meyer Bar, dried at 90° C. for 1 minute, and then irradiated with ultraviolet rays at 150 mJ/cm$^2$ to prepare an anti-glare coating film.

Thereafter, the resin compositions for preparing a low refractive index layer prepared in each of Preparation Examples were coated on the AG-coated surface with Meyer Bar #3 and dried at 90° C. for 1 minute.

The thus-dried product was irradiated with ultraviolet rays of 180 mJ/cm$^2$ under nitrogen purging to prepare a low refractive index layer having a thickness of 110 nm, thereby producing an anti-glare/anti-reflection film.

Experimental Example: Measurement of Physical Properties of Antireflection Films The following experiments were conducted for the antireflection films obtained in the Examples and Comparative Examples.

1. Measurement of Internal Haze

The surface of the antireflective film was subjected to hydrophilization by corona treatment or the like, and then coated with the hard coating solution to which no particles were introduced in the Preparation Example 4, dried at 90° C. for 1 minute, and irradiated with ultraviolet rays of 180 mJ/cm$^2$ to perform a curing treatment. At the time of measuring haze, the transmittance was measured according to JIS K 7361 standard and the haze was measured according to JIS K 7105 standard. The average value was calculated by measuring three times with a haze meter (HM-150, A light source, Murakami Color Research Laboratory).

2. Measurement of Surface Roughness

The ten-point average roughness of the surface irregularities was measured using a white light three-dimensional optical interference profile (3D optical profiler, Model: NewView 7300, Zygo Corporation). The measurement conditions are as follows:
Lens magnification: 10× (Mirau lens)
Zoom magnification: 0.5×
Measurement area (FoV): 1.40*1.05 mm$^2$
Scan length: 5 λm bipolar
Camera Mode: 640*480
Noise suppressing level (Min Mod): 7%

Number of analysis per measurement position: 1
FDA Resolution: High 2G mode
Correction method: Cylinder Fitting The analysis was carried out by attaching a double-sided tape to the opposite surface of the antireflection film to be measured and placing it flat on a sample stage and then obtaining an optical profiler image. Herein, the ten-point average roughness was calculated by carrying out the measurement by setting the width to 3 mm and obtaining 2 or 3 line profiles from the obtained image.

3. Measurement of Average Reflectivity

The average reflectivity was measured using SolidSpec 3700, manufactured by SHIMADZU Corp.

Specifically, a black tape (3M) was attached to a surface of the substrate film on which no hard coating layer was formed so that light could not pass through it, and the measurement conditions were fixed at a sampling interval of 1 nm, a time constant of 0.1 sec, a slit width of 20 nm and a medium scanning speed. Then, 100 T mode was applied, and a light in a wavelength range of 380 nm to 780 nm was irradiated at room temperature to measure the reflectivity.

4. Measurement of Image Clarity

The value of image clarity was measured using ICM-IT manufactured by Suga Test Instrument Co., Ltd. Specifically, the substrate film was mounted on a sample holder, and the image clarity was measured when the slits were at 0.125 mm and 0.25 mm in a transmission mode.

5. Measurement of Gloss

200/60° gloss was measured using micro-TRI-gloss manufactured by BYK Gardner. Specifically, a black tape (3M) was attached to a surface of the substrate film on which no hard coating layer was formed so that light could not pass through it, and the incident angle of light was defined as an average value of data each measured at least five times at 20° and 60°.

6. Evaluation of Hiding Power

To evaluate the hiding power of a panel defect, the reflection diffuse light intensity of the antireflection film was measured using [GP-200] manufactured by Murakami Color Research Laboratory.

The measurement conditions are as follows:
Measurement mode: reflection
Angle of incidence: 45°
Measurement range: −85° to 85°
Light source aperture (VS1) set value: 1 (diameter of 3.5 mm)
Receiver aperture (VS3) set value: 1 (diameter of 2.3 mm)

The measurement was carried out in the order that a standard sample was measured, the specular reflection light intensity was set to 100, and then the films of Examples and Comparative Examples were measured. The standard sample is a film coated with the hard coating having no particles on the same film as the substrate used in Examples and Comparative Examples in a thickness of 5 to 10 μm and satisfies a haze value of 0.1 or less.

A black tape (3M) was attached to a side opposite to the coated surface of the film so that light could not pass through it, the sample was mounted on the sample position, and then the reflection diffuse light intensity was measured. At this time, if the specular light intensity value is greater than 100, the sensitivity control dial was controlled so that the specular light intensity value is 100. Thereafter, a black tape (3M) was attached to the surface of the sample film to be measured on which no hard coating layer was formed so that light could not pass through it, the sample was placed on the sample position, and then the reflection diffusion light intensity was measured in the measurement range of −85° to 85°. The specular reflection light intensity is a reflection diffuse light intensity value at 45° corresponding to the specular reflection of the incident angle. The value of hiding power was obtained by dividing the respective light intensities by the specular light intensities at +1° to −1° from the specular reflection into calculate the ratios thereof, and the average value was obtained.

TABLE 3

Details of the antireflection films of Examples and experimental results thereof

|  | Example 1 | Example 2 | Example 3 | Example 4 | Example 5 | Example 6 |
|---|---|---|---|---|---|---|
| AG coating solution | Preparation Example 1 | Preparation Example 2 | Preparation Example 3 | Preparation Example 4 | Preparation Example 5 | Preparation Example 6 |
| AG dry thickness (μm) | 6 | 7 | 6 | 6 | 7 | 6 |
| LR coating solution | Preparation Example 6 | Preparation Example 6 | Preparation Example 6 | Preparation Example 6 | Preparation Example 6 | Preparation Example 7 |
| Total Haze (%) | 0.8 | 2.6 | 2.3 | 2.5 | 2.8 | 2.8 |
| Internal Haze (%) | 0.6 | 2.4 | 2.1 | 2.3 | 2.7 | 2.3 |
| Rz(μm) | 0.1762 | 0.1936 | 0.1746 | 0.1932 | 0.167 | 0.1826 |
| Average reflectivity (%) | 1.1 | 1.1 | 1.1 | 1.1 | 1.1 | 1.1 |
| Gloss (20°/60°) | 28/53.4 | 27/53.0 | 27/53 | 26.4/55 | 26/53.5 | 27/55 |
| Image clarity 0.125 mm slit | 67.7 | 58.7 | 57.9 | 59.4 | 68.3 | 59.8 |
| Image clarity 0.25 mm slit | 71.3 | 60.3 | 59.2 | 60.4 | 72 | 61 |
| Specular reflection light intensity | 85.5 | 60.3 | 59.2 | 60.4 | 54.94 | 85.16 |
| Hiding power | 0.014 | 0.041 | 0.063 | 0.069 | 0.068 | 0.033 |
| Scratch resistance (g) | 300 | 300 | 300 | 300 | 300 | 300 |
| Black visibility | good | good | good | good | good | good |

TABLE 4

Details of the antireflection films of Comparative
Examples and experimental results thereof

|  | Comparative Example 1 | Comparative Example 2 | Comparative Example 3 | Comparative Example 4 |
|---|---|---|---|---|
| AG coating solution | Comparative Preparation Example 1 | Comparative Preparation Example 2 | Comparative Preparation Example 3 | Comparative Preparation Example 4 |
| AG dry thickness(μm) | 6 | 6 | 6 | 6 |
| LR coating solution | Preparation Example 6 | Preparation Example 6 | Preparation Example 6 | Preparation Example 6 |
| Total Haze (%) | 2.1 | 3.2 | 0.6 | 5.4 |
| Internal Haze (%) | 1.7 | 2.5 | 0.4 | 5.3 |
| Rz(μm) | 0.3469 | 0.639 | 0.1546 | 0.1306 |
| Average reflectivity (%) | 1.1 | 1.1 | 1.1 | 1.1 |
| Gloss (20°/60°) | 24/54 | 23.5/49 | 28/53.36 | 28.5/55.5 |
| Image clarity 0.125 mm slit | 59.3 | 56 | 80 | 68.3 |
| Image clarity 0.25 mm slit | 60.6 | 57.1 | 81 | 72 |
| Specular reflection light intensity | 84.08 | 79.76 | 87.2 | 76.5 |
| Hiding power | 0.112 | 0.612 | 0.004 | 0.003 |
| Black visibility | moderate | poor | good | poor |
| Scratch resistance (g) | 300 | 300 | 300 | 300 |

As shown in Table 1 and 2 above, the hard coating layers of the antireflection films of Examples satisfy the condition that a ten-point average roughness (Rz) of the surface irregularities is 0.05 μm to 0.2 μm and an internal haze is 0.5% to 5%, and accordingly, it was confirmed that the sparkling phenomenon can be prevented, and that optical characteristics such as enhanced visibility, excellent external black visibility and contrast ratio, etc. can be secured. Further, in the result of the diffuse distribution of the reflected light source for the antireflection films of Examples, the average value of the ratio of the respective light intensity values to the specular reflection light intensity values at an angle of ±1° and −1° from the specular reflection was maintained in the range of 0.005 to 0.100, thereby confirming that it is possible to implement improved antireflection effect and hiding power of panel defects.

In contrast, the ten-point average roughness of the surface irregularities of the hard coating layers of the antireflection films of Comparative Examples 1 and 2 exceeded 0.2 μm, and accordingly, not only the image clarity and gloss were relatively low, but also the deterioration of resolution, such as sparkling, appeared. Moreover, the value of the hiding power of panel defects exceeded 0.100, thereby indicating that the image appeared to be distorted and the clarity of colors including black color was lowered.

In addition, the internal haze of the hard coating layers of the antireflection films of Comparative Examples 3 and 4 was less than 0.5%, and the image clarity and gloss could be secured to some extent, but the average value of the ratio of the respective light intensity values to the specular reflection light intensity values at an angle of +1° and −1° from the specular reflection was considerably low, thereby indicating that that it was difficult to secure sufficient hiding power of panel defects.

The invention claimed is:

1. An antireflection film, comprising:
   a hard coating layer having a ten-point average roughness (Rz) of the surface irregularities in range of 0.05 μm to 0.2 μm and an internal haze in range of 2.1% to 5%;
   a low refractive index layer formed on the hard coating layer; and
   wherein in the result of the diffuse distribution of the reflected light source for the antireflection film, the average value of the ratio of the respective light intensity values to the specular reflection light intensity values at an angle of +1° and −1° from the specular reflection is 0.005 to 0.100,
   wherein the result of the diffuse distribution of the reflected light source for the antireflection film applies an incident angle of 45°, and the specular reflection light intensity value is a reflection diffuse light intensity value at 45° corresponding to the specular reflection of the incident angle.

2. The antireflection film of claim 1, wherein the hard coating layer has an internal haze in a range of 2.1% to 2.7%.

3. The antireflection film of claim 1, wherein the antireflection film has a reflectivity of 1.6% or less in a wavelength region of 380 nm to 780 nm.

4. The antireflection film of claim 1, wherein the hard coating layer comprises a binder resin including a (co)polymer of a photopolymerizable compound and an organic or inorganic fine particle dispersed in the binder resin.

5. The antireflection film of claim 4, wherein the hard coating layer comprises at least two types of organic or inorganic fine particles, and the difference in the refractive index between at least two types in the at least two types of organic or inorganic fine particles is 0.01 to 0.08.

6. The antireflection film of claim 4, wherein the hard coating layer further comprises an inorganic nanoparticle having a diameter of 1 nm to 150 nm.

7. The antireflection film of claim 4, wherein the binder resin of the hard coating layer further comprises a high molecular weight (co)polymer having a weight average molecular weight of 10,000 or higher.

8. The antireflection film of claim 1, wherein the low refractive index layer comprises a binder resin comprising a (co)polymer of a photopolymerizable compound and a fluorine-containing compound or a silicon-based compound containing a photoreactive functional group.

9. The antireflection film of claim 8, wherein the binder resin of the low refractive index layer comprises polysilsesquioxane in which at least one reactive functional group is substituted.

10. The antireflection film of claim 9, wherein the at least one reactive functional group is selected from the group consisting of an alcohol, an amine, a carboxylic acid, an epoxide, an imide, a (meth)acrylate, a nitrile, a norbornene, an olefin, a polyethylene glycol, a thiol, and a vinyl group.

11. The antireflection film of claim 1, wherein the photoreactive functional group contained in the fluorine-containing compound or silicon-based compound is at least one functional group selected from the group consisting of a (meth)acrylate group, epoxide group, vinyl group, and thiol group.

12. The antireflection film of claim 1, wherein the fluorine-containing compound containing a photoreactive functional group includes at least one selected from the group consisting of i) an aliphatic compound or an aliphatic cyclic compound in which at least one photoreactive functional group is substituted and at least one fluorine is substituted on at least one carbon;

ii) a heteroaliphatic compound or a heteroaliphatic cyclic compound in which at least one photoreactive functional group is substituted, at least one hydrogen is substituted with fluorine, and at least one carbon is substituted with silicon;

iii) a polydialkylsiloxane-based polymer in which at least one photoreactive functional group is substituted and at least one fluorine is substituted on at least one silicon; and iv) a polyether compound in which at least one photoreactive functional group is substituted and at least one hydrogen is substituted with fluorine.

13. The antireflection film of claim 1, further comprising an inorganic fine particle dispersed in the binder resin.

14. The antireflection film of claim 13, wherein the inorganic fine particles included in the low refractive index layer include at least one selected from the group consisting of hollow inorganic fine particles having a number average particle diameter of 10 to 200 nm and solid-type inorganic fine particles having a number average particle diameter of 0.5 to 10 nm.

15. The antireflection film of claim 13, wherein the low refractive index layer comprises 10 to 400 parts by weight of the inorganic fine particles and 20 to 300 parts by weight of the fluorine-containing compound or silicon-based compound including a photoreactive functional group based on 100 parts by weight of the (co)polymer of the photopolymerizable compound.

16. The antireflection film of claim 1, wherein the low refractive index layer comprises 0.5 to 40 parts by weight of the polysilsesquioxane in which at least one reactive functional group is substituted, based on 100 parts by weight of the (co)polymer of the photopolymerizable compound.

17. A display device comprising the antireflection film of claim 1.

* * * * *